United States Patent
Mayer (10) Patent No.: US 9,022,328 B2
(45) Date of Patent: May 5, 2015

(54) CENTER ARMREST SUPPORTING STRUCTURE

(75) Inventor: Matthias Mayer, Bamberg (DE)

(73) Assignee: F.S. Fehrer Automotibe GmbH (DE)

( * ) Notice: Subject to any disclaimer, the term of this patent is extended or adjusted under 35 U.S.C. 154(b) by 453 days.

(21) Appl. No.: 13/283,673

(22) Filed: Oct. 28, 2011

(65) Prior Publication Data

US 2012/0126071 A1    May 24, 2012

(30) Foreign Application Priority Data

Nov. 22, 2010    (DE) .................... 10 2010 051 699

(51) Int. Cl.
*B68G 5/00*    (2006.01)
*B60N 2/46*    (2006.01)

(52) U.S. Cl.
CPC ..................... *B60N 2/4606* (2013.01)

(58) Field of Classification Search
USPC ........... 248/118, 292.14, 288.11; 297/411.38, 297/411.32, 411.29; 16/348, 357, 325
See application file for complete search history.

(56) References Cited

U.S. PATENT DOCUMENTS

| | | | | |
|---|---|---|---|---|
| 3,359,029 | A * | 12/1967 | Fernberg | 292/263 |
| 4,496,190 | A * | 1/1985 | Barley | 297/411.38 |
| 4,621,864 | A * | 11/1986 | Hill | 297/115 |
| 4,655,501 | A * | 4/1987 | Ishigami et al. | 297/113 |
| 4,828,323 | A * | 5/1989 | Brodersen et al. | 297/411.36 |
| 4,848,840 | A * | 7/1989 | Toya | 297/411.32 |
| 4,953,259 | A * | 9/1990 | Frye et al. | 16/225 |
| 5,058,240 | A * | 10/1991 | Barda et al. | 16/325 |
| 5,076,645 | A * | 12/1991 | Yokota | 297/411.32 |
| 5,116,099 | A * | 5/1992 | Kwasnik et al. | 297/188.15 |
| 5,414,897 | A * | 5/1995 | Loewe | 16/325 |
| 5,425,568 | A * | 6/1995 | Sliney et al. | 297/378.11 |
| 5,476,307 | A * | 12/1995 | Whalen | 297/378.11 |
| 5,597,209 | A * | 1/1997 | Bart et al. | 297/411.38 |
| 5,669,107 | A * | 9/1997 | Carlsen et al. | 16/348 |
| 5,702,157 | A * | 12/1997 | Hurite | 297/411.38 |
| 5,733,010 | A * | 3/1998 | Lewis et al. | 297/411.32 |
| 5,873,633 | A * | 2/1999 | Lang et al. | 297/411.32 |
| 5,894,634 | A * | 4/1999 | Nithammer et al. | 16/325 |
| 6,047,444 | A * | 4/2000 | Braun | 16/324 |
| 6,132,128 | A * | 10/2000 | Burrows | 403/96 |
| 6,178,596 | B1 * | 1/2001 | Choi | 16/325 |
| 6,238,002 | B1 * | 5/2001 | Brewer et al. | 297/411.32 |
| 6,332,647 | B1 * | 12/2001 | Yoshida et al. | 297/238 |

(Continued)

FOREIGN PATENT DOCUMENTS

DE    19820336 A1    11/1999

*Primary Examiner* — Terrell McKinnon
*Assistant Examiner* — Monica Millner
(74) *Attorney, Agent, or Firm* — Quarles & Brady LLP (57) ABSTRACT

A center armrest supporting structure for supporting a swivelable center armrest in a vehicle has an arm support which can be swiveled about a swivel axis into a lower use position and into an upper rest position. Console parts of the vehicle are connected to the arm support by bearing bolts. A stop bolt limits the swivel path of the arm support at least in the use position. A latching bolt prevents unintentional backward swiveling out of the use position and/or the rest position. A latching element has a sliding guide surface along which the stop bolt or the latching bolt slides when the arm support is swiveled A spring element is disposed between the frictional latching element and the bearing bolt, wherein the spring element produces a frictional force between the sliding guide surface and the stop bolt or the latching bolt, which counteracts the swivel movement.

11 Claims, 4 Drawing Sheets

(56) References Cited

U.S. PATENT DOCUMENTS

| | | |
|---|---|---|
| 6,353,970 B1 * | 3/2002 | Spaeth ............................ 16/360 |
| 6,427,956 B1 | 8/2002 | Heckmann et al. |
| 6,533,353 B2 * | 3/2003 | Johnston ....................... 297/330 |
| 6,749,262 B2 * | 6/2004 | Schaffner et al. ......... 297/367 R |
| 6,843,528 B2 * | 1/2005 | Glynn et al. ............. 297/188.01 |
| 7,100,242 B2 * | 9/2006 | Maierholzner ................. 16/319 |
| 7,284,799 B2 * | 10/2007 | Chung ..................... 297/411.38 |
| 8,016,359 B2 * | 9/2011 | Dillinger et al. ......... 297/411.32 |
| 8,052,208 B2 * | 11/2011 | Kim et al. ..................... 297/146 |

* cited by examiner

CENTER ARMREST SUPPORTING STRUCTURE

CROSS REFERENCE TO RELATED APPLICATION

The present application claims the benefit of German Patent Application No. 10 2010 051 699.6 filed Nov. 22, 2010, which are both fully incorporated herein by reference.

STATEMENT REGARDING FEDERALLY SPONSORED RESEARCH OR DEVELOPMENT

Not applicable.

FIELD OF THE INVENTION

The present invention relates to a center armrest supporting structure for supporting a swivelable center armrest for use in a vehicle.

BACKGROUND OF THE INVENTION

From the state of the art manifold embodiments of center armrests are known. In this context, it is frequently required that the center armrest can be swiveled between a lower use position and an upper rest position. For this purpose, a bearing axis or a bearing bolt is generally employed as a connecting means between the arm support of the center armrest and the console parts. Thus, the arm support can be easily swiveled about the bearing axis and the bearing bolt. In addition, it is known to furnish the swiveling mechanism both with a stop function and a latching function, so that the end position can be limited and at the same time unintentional backward swiveling can be prevented.

However, it is a problem that the movement of the arm support between the two end positions cannot be controlled using standard solutions. Hence, the position of the arm support in the swivel region between the use position and the rest position depends on where the center of gravity of the arm support with respect to the swivel axis is located. Thus, when a limiting point is exceeded, the arm support is automatically folded down. However, for reasons of comfort, it is frequently desirable that the arm support is prevented from unintentionally folding down independently of the respective swivel position.

For this purpose, complex frictional damping systems are known from the state of the art, which involve very high costs.

SUMMARY OF THE INVENTION

Thus, it is an object of the present invention to provide a center armrest supporting structure, wherein an arm support can be swiveled about a swivel axis between a lower use position and an upper rest position, wherein the risk of an uncontrolled folding down of the arm support in the intermediate region is eliminated. At the same time, the costs for the center armrest supporting structure shall be kept as low as possible.

This object is attained by an inventive generic center armrest supporting structure described herein.

The generic center armrest supporting structure serves for supporting a swivelable center armrest for use in a vehicle. In this context, an arm support can be swiveled about a swivel axis between a lower use position and an upper rest position. The center armrest supporting structure comprises a left and a right console part as elements of the vehicle. The bearing is created between the armrest and the console parts with the aid of a left and a right bearing bolt. For the purpose of limiting the swivel path of the arm support at least in the use position, a left and/or a right stop bolt is provided. In this regard, it is initially inessential whether the stop bolt is affixed to the arm support and abuts against a corresponding stop at the console parts, or whether the stop bolt is affixed to the console parts and the stop is provided at the arm support. Moreover, the generic center armrest supporting structure has a latching function which prevents unintentional backward swiveling out of the use position and/or the rest position with the aid of a left and/or a right latching bolt or else with the aid of the stop bolt simultaneously acting as a latching bolt in a latching position. In this context, initially it is again inessential whether the latching bolt is affixed to the arm support or is affixed to the console parts. At least, a latching engagement is produced in the corresponding end position, which counteracts the backward movement.

According to the invention, provision is made for the center armrest supporting structure to be supplemented by a left and/or a right frictional latching element. Here, the frictional latching element, at least in the functionally necessary section, is formed as a substantially rigid body. This means that a noticeable deformation does not occur when an external force is exerted on the frictional latching element.

The frictional latching element has a sliding guide surface to enable the function thereof. The stop bolt or the latching bolt slides along said sliding guide surface at least sectionally when the arm support is swiveled between the lower use position and the upper rest position.

Moreover, an elastically deformable spring element is disposed between the frictional latching element and the bearing bolt. The spring force acting due to the elastically deformed spring element produces a frictional force between the sliding guide surface and the stop bolt or the latching bolt. Corresponding to the effect of a frictional force, this force counteracts the swivel movement.

As a result of the newly created solution it is for the first time possible to integrate a so-called deceleration function into the center armrest supporting structure at minimum costs. Hence, an uncontrolled folding down of the arm support in the swivel movement is prevented. The implementation of this function can be realized by advantageously using the frictional force between the sliding guide surface and the stop bolt or the latching bolt, without requiring major additional equipment.

To enable the elastic deformation of the spring element in the arrangement between the sliding guide surface and the bearing bolt, the frictional latching element is advantageously guided with the aid of a rotary guide or a linear guide. Here, the guide needs to be configured such that movement of the sliding guide surface is enabled at least in the center region essentially perpendicular to the sliding guide surface. Hence, it is ensured that the normal forces in the sliding guide act on the spring element as directly as possible and the part of the forces acting on the guide is kept to a minimum.

Here, in an advantageous embodiment, the frictional latching element is mounted at the arm support. Thus, it is obvious in this case that the frictional latching element is moved simultaneously with the swivel movement of the arm support. Thus, the frictional latching element moves with the arm support counter to the upright console parts. As a result, the counteracting stop bolt or latching bolt needs to be arranged in a fixed assignment to the respective console part.

In this context, it is particularly advantageous if the stop bolt is affixed to the arm support, wherein the frictional latching element is swivelably mounted on the stop bolt. Thus, the necessary stop bolt can be employed in an easy manner directly for providing the rotary support of the frictional latching element. Hence, additional measures for realizing the rotary guide or the linear guide are not necessary. As a consequence, in this alternative embodiment it is necessary that the latching bolt which slides along the sliding guide surface is affixed to the respective console part.

When the frictional latching element is arranged, the available range of movement thereof is limited on one side by the sliding guide surface in interaction with the corresponding stop bolt or latching bolt. Hence, regarding this direction, no measures for securing the position are required. In the opposite direction, the movement of the frictional latching element is limited by the spring element which is disposed between the frictional latching element and the bearing bolt. The position of the frictional latching element is advantageously secured by the rotary guide or the linear guide transverse to said directions between the sliding guide surface and the spring element. Hence, it is initially inessential whether the frictional latching element completely surrounds the bearing bolt or is merely disposed on the side situated between the bearing bolt and the sliding guide surface.

However, it is particularly advantageous if the frictional latching element has a bolt opening in which the bearing bolt is arranged, wherein the bolt opening is larger than the bearing bolt at least on the side pointing toward the sliding guide surface. The embodiment having a bolt opening is advantageous to the effect that the position on the bearing bolt is easily ensured when the frictional latching element is mounted. This aspect equally simplifies further assembly of the respective unit or the arm support with the frictional latching element at the respective counterpart or the console part, respectively.

The type of the spring element is initially irrelevant. Hence, it is also irrelevant of which material the spring element is made, provided that it is ensured that the elastic deformation produces a corresponding spring force and thus a corresponding frictional force at the sliding guide surface. However, it is particularly advantageous if the spring element is made of an elastomer or similar, wherein in this case, the spring force is produced by the deformation of the entire spring element in the form of a block-shaped body.

As regards the configuration of the center armrest supporting structure, it is advantageous if the armrest remains in the respective position in an arbitrary position in the region outside the latching position in the absence of external intervention. Consequently, it is ensured that the armrest does not further fold down when the same is released in an intermediate position, but remains in the previously retained position.

For the purpose of attaining high stability of the entire arrangement it is particularly advantageous if the bearing bolts are formed by a continuous bearing axis. Thus, the bearing forces can be introduced into the arm support in a particularly advantageous manner. Corresponding to the forces acting in the stop bolts it is equally advantageous if the stop bolts are formed by a continuous stop axis. Thus, also in this case, the supporting forces acting in the stop bolts are advantageously distributed in the arm support.

To simplify construction and production as well as to optimize costs it is particularly advantageous if the center armrest supporting structure has a structure which is symmetrical with respect to the center of the center armrest and has symmetrical and/or identical frictional latching elements and stop bolts and latching bolts disposed on the left-hand side and on the right-hand side.

The use of the center armrest supporting structure in a center armrest which is a part of a backseat bench is particularly advantageous. In this context, the armrest in the rest position partially forms a part of the backrest of the backseat bench. Here, it is particularly advantageous if the armrest on the side pointing toward the passenger compartment in the rest position is provided with a cushion.

BRIEF DESCRIPTION OF THE DRAWINGS

In the following figures an inventive center armrest supporting structure is schematically illustrated by way of example.

In the drawings.

DETAILED DESCRIPTION OF THE EXAMPLE EMBODIMENTS

Figure 1:
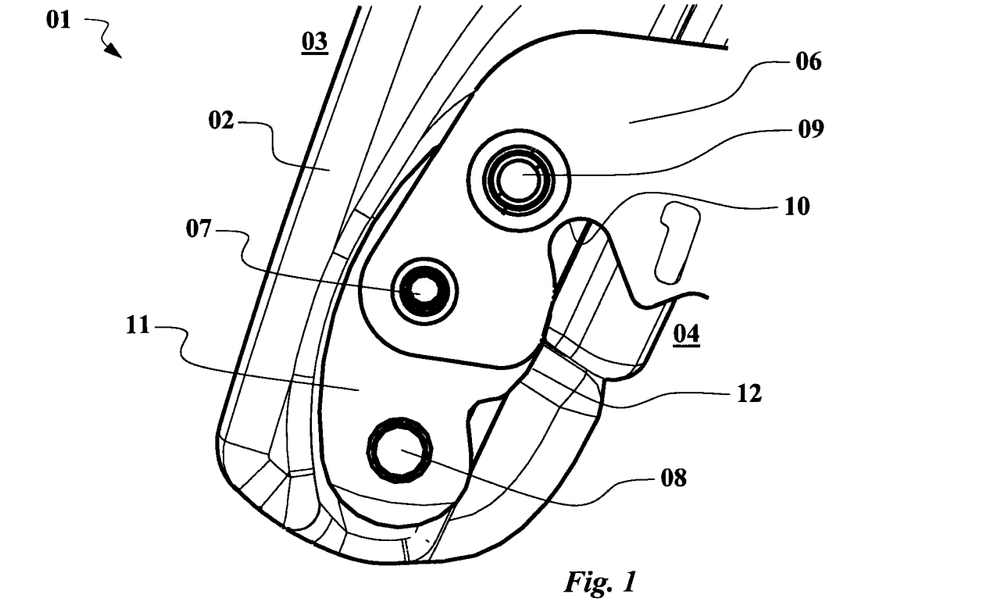
FIG. 1 shows a section of a lateral view of a center armrest supporting structure in an exemplary embodiment in the rest position.

FIG. 1 by way of example schematically illustrates an embodiment of an inventive center armrest supporting structure. The center armrest 01 is shown in the rest position. Here, the cushioned surface 03 of the arm support 03 lies on the left-hand side and the supporting surface 04 for use as an arm support lies on the right-hand side. The arm support 02 is connected to the console part 06 with the aid of the bearing axis 07. In the rest position the stop bolt 08 is disposed in the lower position. Moreover, the frictional latching element 11 is shown, which is located between the console part 06 and the arm support 02 and which is mounted here at the stop bolt 08 at the arm support 02. According to the invention, the frictional latching element 11 has the necessary sliding guide surface 12. Moreover, the position of the latching bolt 09 arranged at the console part 06 is shown. Here, the console part 06 has the necessary stop 10 for limiting the swivel path of the arm support 02.

Figure 2:
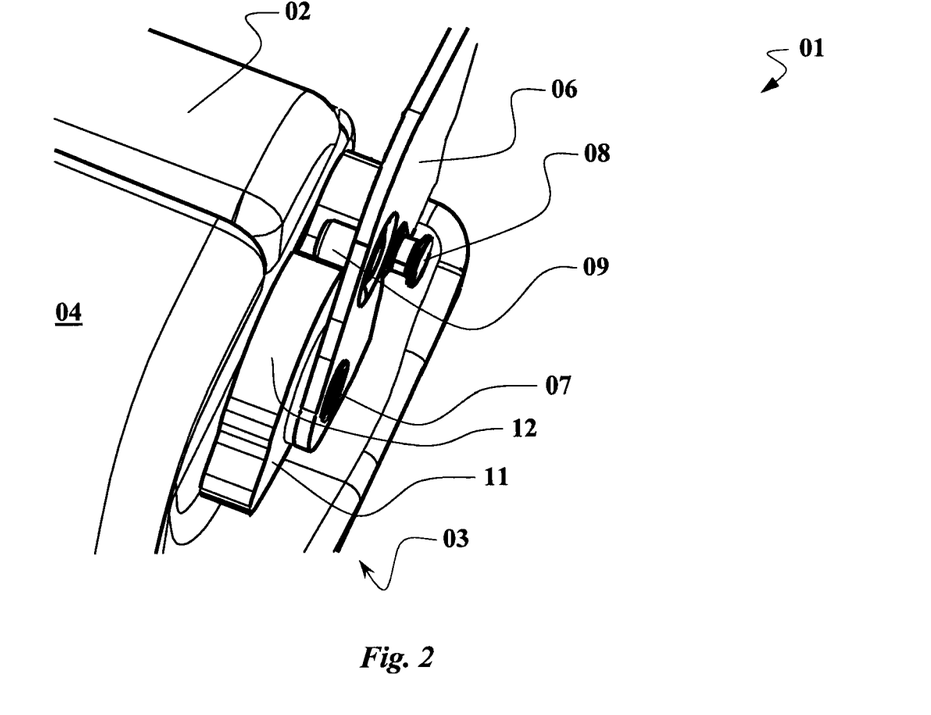
FIG. 2 shows the center armrest supporting structure according to FIG. 1 in the use position.

FIG. 2 shows the embodiment of the center armrest supporting structure according to FIG. 1 in the use position. Here, the supporting surface 04 of the arm support 02 is disposed on the upper side and the cushioned surface 03 is disposed on the lower side. Moreover, the console part 06 is shown, which produces the connection to the arm support 02 via the bearing bolt 07. In the current position the swivel path is limited by the abutment of the stop bolt 08 against the stop 10 of the corresponding console part 06. Moreover, the arrangement of the frictional latching element 11 between the console part 06 and the arm support 02 is shown. In the illustrated perspective, the sliding guide surface 12 is here disposed on the upper side. The latching bolt 09 slides along said surface until reaching the illustrated latching position.

Figure 3:
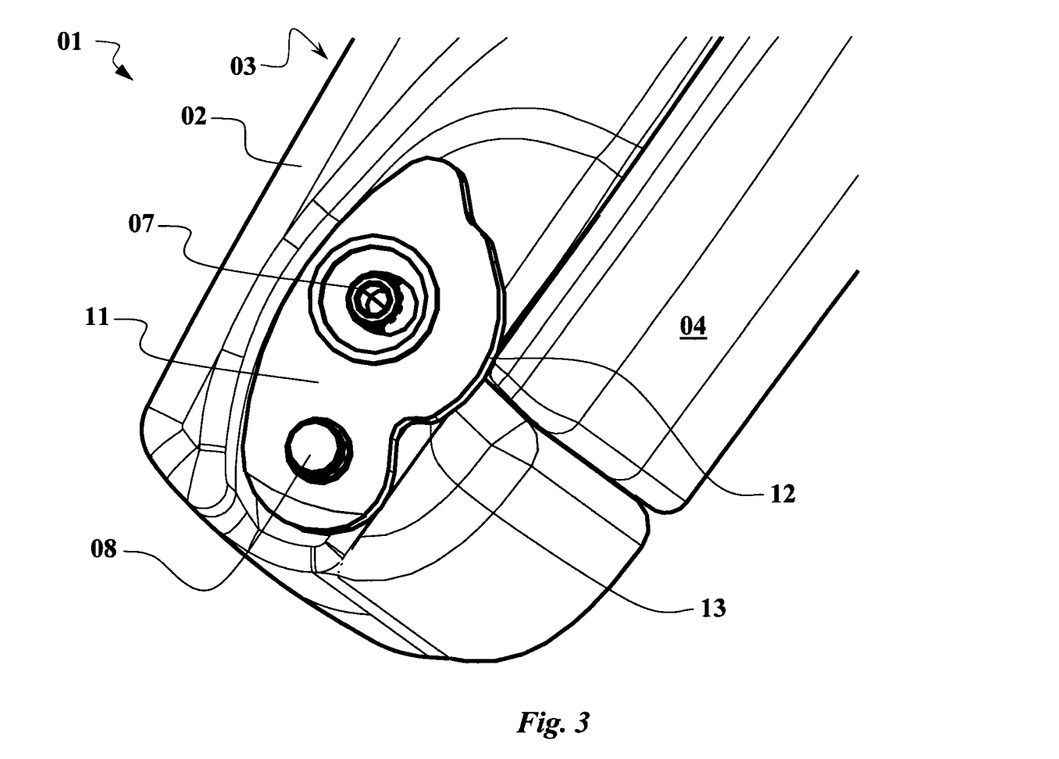
FIG. 3 shows the center armrest 01 according to FIG. 1.

FIG. 3 schematically illustrates the center armrest 01 according to FIG. 1 without the console part. Here again firstly the arm support 02 having the supporting surface 04 and the cushioning surface 03, which is disposed at the rear side, is shown. The connection to the console part is produced by the bearing bolt 07. Moreover, the arm support 02 has the stop bolt 08 which in turn has the frictional latching element 11 swivelably mounted thereon. Hence, said frictional latching element 11 is allowed to move over a small swivel path surrounding the stop bolt 08. Moreover, the frictional latching element 11 has the required recess for receiving the bearing bolt 07. The sliding guide surface 12 is the relevant element of the frictional latching element 11 and is supplemented at one end by the first latching mechanism 13.

Figure 4:
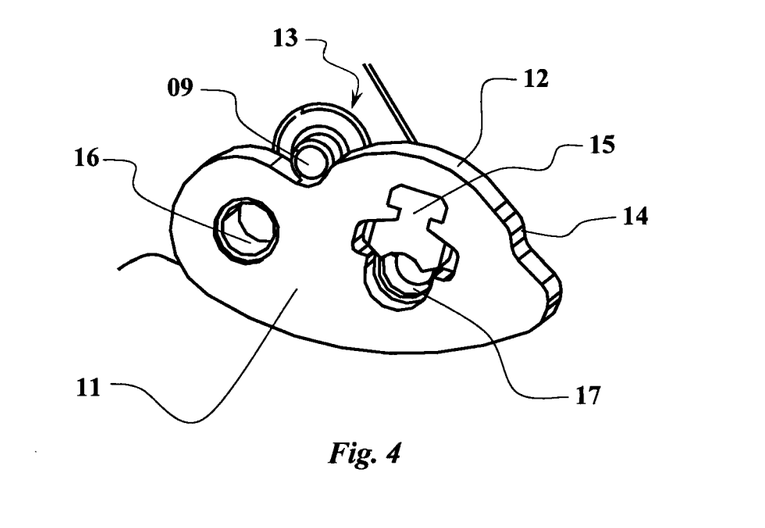
FIG. 4 shows a frictional latching element 11 for use according to FIG. 1.

The latching position in the use position is particularly clearly shown in FIG. 4 by illustrating the frictional latching element 11 connected to the latching bolt 09. Here, the frictional latching element 11 has the sliding guide surface 12. In the end position the latching bolt 09 reaches a correspondingly lower position in the first latching mechanism 13. A projection and subsequently a recess for the latching bolt 09 are equally formed on the other side, which thus provides a second latching mechanism 14. The mounting of the frictional latching element 11 at the arm support is realized via the bearing bore 16. The position of the frictional latching element 11 at the arm support in the mounting state is ensured by the bolt opening 17 which is slightly larger than the bearing bolt 07. According to the invention, the spring element 15 is disposed between the bearing bolt 07 and the sliding guide surface 12. This spring element 15 in the present example is a deformable elastomer body.

Figure 5A:
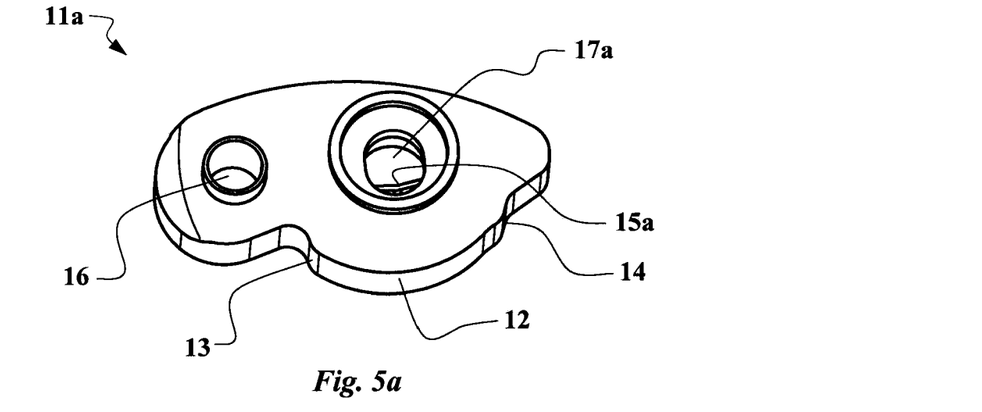
FIG. 5 shows further views of the frictional latching element 11*a* according to FIG. 4.
Figure 5B:
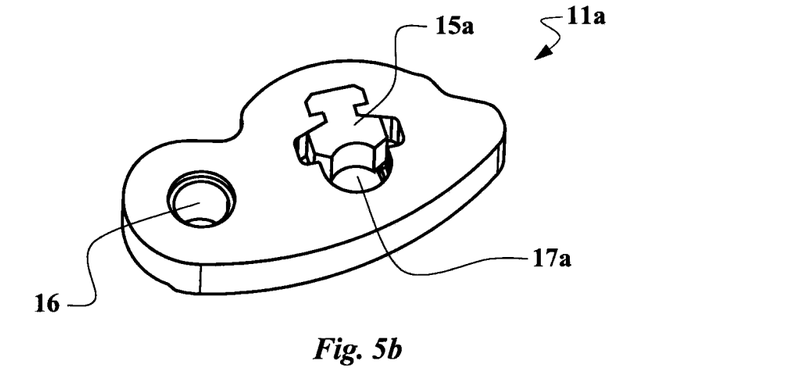

FIG. 5 again schematically illustrates the frictional latching element 11*a* corresponding to the embodiment according to FIG. 4. Again, the sliding guide surface 12 having the two latching mechanisms 13 and 14 as well as the bearing bore 16 and the bolt opening 17*a* is shown. Again, the elastomer body in the form of a spring element 15*a* is shown.

Figure 6:
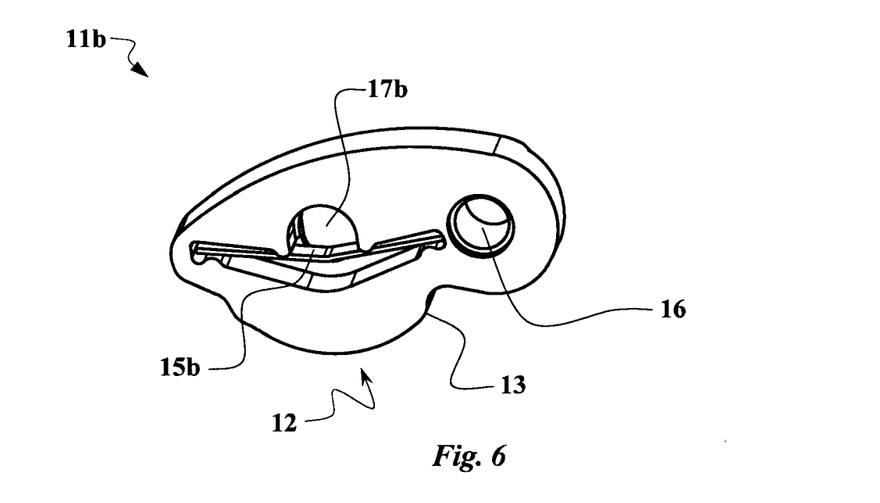
FIG. 6 shows an alternative embodiment of a frictional latching element 11*b*.

In addition, FIG. 6 shows an alternative embodiment for a frictional latching element 11*b*. In contrast to the previous embodiment the spring element 15*a* is realized by a leaf spring. Accordingly, the bolt opening 17*b* is slightly modified compared to the previous embodiment.

Figure 7A:
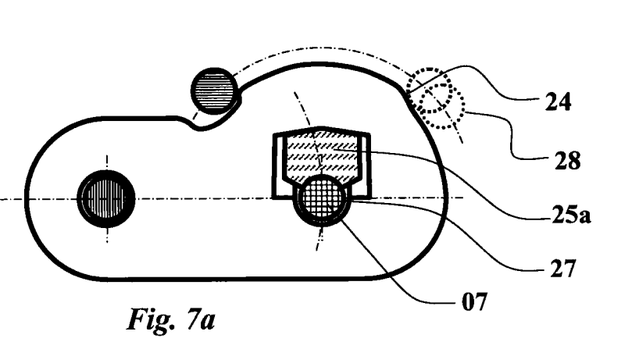
FIG. 7 shows schematic diagrams of the effect produced by the inventive center armrest supporting structure.

FIG. 7 schematically illustrates the inventive effect by way of example. In FIG. 7*a* the center armrest is swiveled into the use position. The position of the bearing bolt 07 in any case remains unchanged. According to this exemplary embodiment, the latching bolt 09 is equally affixed to the vehicle or the console part, respectively. Hence, the positions of the bearing bolt 07 and the latching bolt 09 are not changed during the swiveling action. By contrast, when the arm support is swiveled, the stop bolt 08, which is affixed to the arm support, as well as the latching element 21 having the spring element 25 are simultaneously swiveled. Starting from FIG. 7*a*, the latching engagement of the latching bolt 09 in the first latching position 23 is shown. In the subsequent movement, the spring element 25*a*, which is firstly only slightly deformed in the initial position, is depressed in response to the latching bolt 09 sliding along the sliding surface 22. By means of this deformation of the spring element 25*b* a corresponding normal force is produced in the friction surface, which accordingly counteracts the movement as a frictional force. Thus, it is obvious that the swivel movement is decelerated by the inventive solution and thus enables retention of the arm support without external intervention.

Figure 7B:
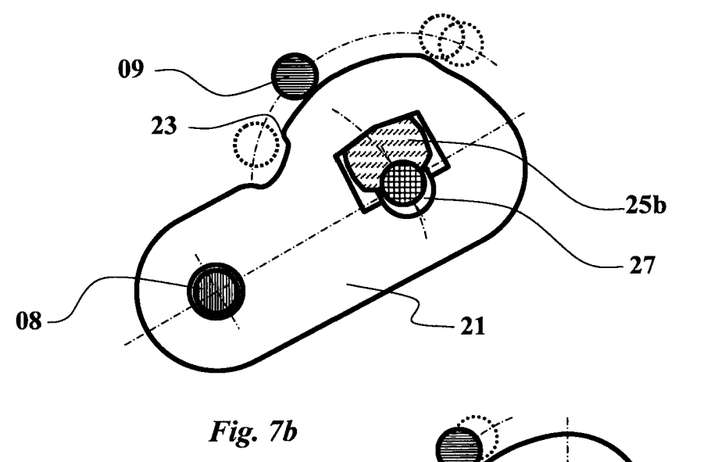
Figure 7C:
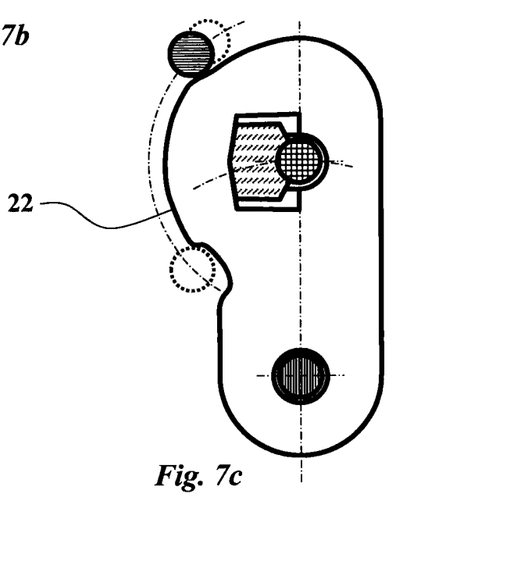

Finally, in addition to the movement shown in FIG. 7*b*, FIG. 7*c* shows the end position of the center armrest in the rest position. Here, the latching bolt 09 is equally disposed behind a second latching mechanism 24, which thus equally counteracts a movement out of the rest position. In addition, the position of the latching bolt 09 in a free mounting space 28 is schematically illustrated, wherein the spring element 25 is not deformed. Thus, the inventive frictional latching element 21 can be easily mounted with the spring element 25.

It is obvious that in the frictional latching element merely the region between the sliding guide surface 22 and the spring element 25 is required for realizing the schematically illustrated embodiment. The region facing the bearing bolt 07 at the frictional latching element is merely necessary for ensuring the position when the frictional latching element 21 is mounted.

The invention claimed is:

1. An armrest supporting structure for supporting a swivelable armrest for use in a vehicle having left and right console parts, said supporting structure comprising:
   an arm support swivelable about a swivel axis along a swivel path between a lower use position and an upper rest position;
   a left bearing bolt and a right bearing bolt defining said swivel axis, each of said left bearing bolt and right bearing bolt extending from said arm support for connecting the arm support to the console parts;
   at least one of a left stop bolt and a right stop bolt, said at least one of the left stop bolt and the right stop bolt extending from said arm support and engageable with a console part for limiting the swivel path of the arm support at least in the use position;
   at least one of a left latching bolt, a right latching bolt, the left stop bolt, and/or the right stop bolt extending from said arm support in a latching position preventing unintentional backward swiveling of the arm support out of at least one of the use position and/or the rest position;
   at least one of a left frictional latching element and a right frictional latching element engageable with said at least one of the left latching bolt, the right latching bolt, the left stop bolt, and/or the right stop bolt extending from said arm support in a latching position preventing unintentional backward swiveling of the arm support, wherein the at least one of the left frictional latching element and the right frictional latching element has a sliding guide surface along which the at least one of the left latching bolt, the right latching bolt, the left top holt, and/or the right stop bolt slides when the arm support is swiveled; and
   an elastically deformable spring element disposed between the at least one of the left frictional latching element and the right frictional latching element and at least one of the left bearing bolt and the right bearing bolt, wherein the spring element engages the at least one of the left bearing bolt and the right bearing bolt and urges the at least one of the left frictional latching element and the right latching element against the at least one of the left latching bolt, the right latching bolt, the left stop bolt, and/or the right stop bolt producing a frictional force between the sliding guide surface and the at least one of the left latching bolt, the right latching bolt, the left stop bolt, and/or the right stop bolt which counteracts swivel movement of said arm support along said swivel path.

2. The armrest supporting structure according to claim 1, in which the at least one of the left frictional latching element and the right frictional latching element has a rotary guide or a linear guide.

3. The armrest supporting structure according to claim 2, in which the rotary guide or the linear guide connects the at least one of the left frictional latching element and the right frictional latching element to the arm support.

4. The armrest supporting structure according to claim 3, in which the at least one of the eft stop beltbolt and the right stop bolt is affixed to the arm support, wherein the at least one of the left frictional latching element and the right frictional latching element is swivelably mounted on the at least one of the left stop bolt and the right stop bolt, wherein the at least one of the left latching bolt, the right latching bolt, the left stop bolt, and/or the right stop bolt which slides along the sliding guide surface is affixed to the console part.

5. The armrest supporting structure according to claim 1, in which the at least one of the left frictional latching element and the right frictional latching element has a bolt opening which has the at least one of the left bearing bolt and the right bearing bolt arranged therein, wherein the bolt opening is larger than the at least one of the left bearing bolt and the right bearing bolt at least on a side pointing toward the sliding guide surface.

6. The armrest supporting structure according to claim 1, in which the spring element is made of an elastomer.

7. The armrest supporting structure according to claim 1, in which in an arbitrary position in a region outside the latching position said frictional force maintains said arm support in said arbitrary position without any application of additional force.

8. The armrest supporting structure according to claim 1, in which the bearing bolts are formed by a continuous bearing axis and the at least one of the left stop bolt and the right stop bolt is formed by a continuous stop axis.

9. The armrest supporting structure according to claim 1, including a structure which is symmetrical with respect to the center of the armrest and has symmetrical and/or identical frictional latching elements as well as stop bolts and latching bolts disposed on the left-hand side and on the right-hand side.

10. The armrest supporting structure according to claim 1, in which the armrest is a part of a backseat bench, wherein the armrest in the rest position partially forms the backrest of the backseat bench.

11. An armrest supporting structure for supporting a swivelable armrest for use in a vehicle having console parts, said supporting structure comprising:
- an arm support swivelable about a swivel axis along a swivel path between a lower use position and an upper rest position;
- a bearing bolt defining the swivel axis;
- a frictional latching element having a sliding guide surface defining at least a portion of the swivel path between the lower use position and the upper rest position;
- a latching bolt sliding along the sliding guiding surface; and
- an elastically deformable spring element disposed between the frictional latching element and the bearing bolt, wherein the spring element engages the bearing bolt and urges the latching element against the latching bolt producing a frictional force between the sliding guide surface and the latching bolt resisting swivel movement of the arm support.

\* \* \* \* \*

UNITED STATES PATENT AND TRADEMARK OFFICE
CERTIFICATE OF CORRECTION

| | |
|---|---|
| PATENT NO. | : 9,022,328 B2 |
| APPLICATION NO. | : 13/283673 |
| DATED | : May 5, 2015 |
| INVENTOR(S) | : Matthias Mayer |

It is certified that error appears in the above-identified patent and that said Letters Patent is hereby corrected as shown below:

On the title page item (73), the assignee's name "F.S. FEHRER AUTOMOTIBE GMBH" should be:
-- F.S. FEHRER AUTOMOTIVE GMBH --

In the claims,
Column 6, line 38
"top holt" should be -- stop bolt --

Signed and Sealed this
Fifteenth Day of March, 2016

Michelle K. Lee
*Director of the United States Patent and Trademark Office*